(12) United States Patent
Shaffer et al.

(10) Patent No.: US 9,112,746 B2
(45) Date of Patent: Aug. 18, 2015

(54) METHOD AND SYSTEM FOR MANAGING VIRTUAL TALK GROUPS

(75) Inventors: Shmuel Shaffer, Palo Alto, CA (US); Shah Talukder, Los Gatos, CA (US); Kittur V. Nagesh, Saratoga, CA (US); Douglas J. Hall, Westerville, OH (US); Larry R. Metzger, Wake Forest, NC (US); Yogesh Kalley, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 530 days.

(21) Appl. No.: 11/399,031

(22) Filed: Apr. 5, 2006

(65) Prior Publication Data
US 2007/0239824 A1    Oct. 11, 2007

(51) Int. Cl.
| | |
|---|---|
| *G06F 15/16* | (2006.01) |
| *H04L 29/06* | (2006.01) |
| *H04M 3/42* | (2006.01) |
| *H04M 3/56* | (2006.01) |
| *H04L 12/18* | (2006.01) |
| *H04L 29/12* | (2006.01) |

(Continued)

(52) U.S. Cl.
CPC ...... *H04L 29/06027* (2013.01); *H04L 65/4046* (2013.01); *H04M 3/42187* (2013.01); *H04M 3/56* (2013.01); *H04L 12/1836* (2013.01); *H04L 29/12037* (2013.01); *H04L 61/106* (2013.01); *H04M 2203/2044* (2013.01); *H04M 2207/18* (2013.01); *H04W 4/10* (2013.01); *H04W 76/005* (2013.01)

(58) Field of Classification Search
CPC .................................................. H04L 12/1836
USPC .......................................................... 709/200
See application file for complete search history.

(56) References Cited

U.S. PATENT DOCUMENTS

| | | | |
|---|---|---|---|
| 4,359,603 A | 11/1982 | Heaton | 370/267 |
| 4,730,306 A | 3/1988 | Uchida | 370/263 |
| 5,014,345 A | 5/1991 | Comroe et al. | 455/54 |

(Continued)

FOREIGN PATENT DOCUMENTS

| | | | | |
|---|---|---|---|---|
| EP | 1 519 594 A2 | 3/2005 | | H04Q 3/00 |
| EP | 1 622 408 A1 | 2/2006 | | H04Q 7/28 |

(Continued)

OTHER PUBLICATIONS

NetworkFirst Interoperability Solved, Data Sheet, M/A-COM, Inc., ECR-7018A, http://www.networkfirst.com/resources/pdf/NetworkFirstRevised5_03.pdf, 6 pages.

(Continued)

*Primary Examiner* — Kevin Mai
(74) *Attorney, Agent, or Firm* — Baker Botts L.L.P.

(57) ABSTRACT

A method for managing virtual talk groups includes facilitating communications from a plurality of endpoints via an interoperability system. The plurality of endpoints comprises endpoints of different communication networks. The method includes configuring a virtual talk group comprising a first group of the plurality of endpoints and assigning to at least one endpoint of the first group of the plurality of endpoints of the virtual talk group functionality with respect to the interoperability system based on a relative priority of the at least one endpoint to other endpoints of the first group of the plurality of endpoints.

16 Claims, 3 Drawing Sheets

(51) Int. Cl.
  *H04W 4/10* (2009.01)
  *H04W 76/00* (2009.01)

(56) References Cited

U.S. PATENT DOCUMENTS

| | | |
|---|---|---|
| 5,048,082 A | 9/1991 | Krafft et al. ............. 379/406.07 |
| 5,099,510 A | 3/1992 | Blinken et al. ............ 379/202.01 |
| 5,274,782 A | 12/1993 | Chalasani et al. ............. 395/325 |
| 5,436,896 A | 7/1995 | Anderson et al. .............. 370/260 |
| 5,539,741 A | 7/1996 | Barraclough et al. ......... 370/267 |
| 5,625,407 A | 4/1997 | Biggs et al. ................. 348/14.11 |
| 6,011,851 A | 1/2000 | O'Connor et al. .............. 381/17 |
| 6,094,578 A | 7/2000 | Purcell et al. ................. 455/426 |
| 6,178,237 B1 | 1/2001 | Horn ........................ 379/202.01 |
| 6,185,205 B1 | 2/2001 | Sharrit et al. ................. 370/389 |
| 6,233,315 B1 | 5/2001 | Reformato et al. ......... 379/88.01 |
| 6,327,567 B1 | 12/2001 | Willehadson et al. ........ 704/270 |
| 6,374,100 B1 | 4/2002 | Smith et al. .................. 455/419 |
| 6,400,816 B1 | 6/2002 | Hjalmtysson et al. ... 379/201.03 |
| 6,404,873 B1 | 6/2002 | Beyda et al. ............. 379/202.01 |
| 6,408,327 B1 | 6/2002 | McClennon et al. ......... 709/204 |
| 6,418,214 B1 | 7/2002 | Smythe et al. ........... 379/202.01 |
| 6,453,022 B1 | 9/2002 | Weinman, Jr. ............. 379/88.13 |
| 6,501,739 B1 | 12/2002 | Cohen .......................... 370/260 |
| 6,608,820 B1 | 8/2003 | Bradshaw, Jr. ................ 370/260 |
| 6,792,092 B1 | 9/2004 | Michalewicz ................ 379/202 |
| 6,810,259 B1 | 10/2004 | Zhang ........................ 455/456.5 |
| 6,850,496 B1 | 2/2005 | Knappe et al. ................ 370/260 |
| 6,873,854 B2 | 3/2005 | Crockett et al. .............. 455/518 |
| 6,882,856 B1 * | 4/2005 | Alterman et al. ............. 455/519 |
| 6,885,874 B2 | 4/2005 | Grube et al. .................. 455/520 |
| 6,912,389 B2 | 6/2005 | Bright et al. .................. 455/433 |
| 6,982,961 B2 | 1/2006 | Refai et al. .................... 370/265 |
| 6,987,480 B1 | 1/2006 | Kotick et al. .................... 342/41 |
| 6,987,841 B1 | 1/2006 | Byers et al. ................. 379/88.17 |
| 6,993,120 B2 | 1/2006 | Brown et al. ............... 379/88.13 |
| 6,996,406 B2 | 2/2006 | Lection et al. ................ 455/457 |
| 6,999,782 B2 | 2/2006 | Shaughnessy et al. ....... 455/518 |
| 6,999,783 B2 | 2/2006 | Toyryla et al. ................ 455/519 |
| 7,003,286 B2 | 2/2006 | Brown et al. ................. 455/416 |
| 7,006,607 B2 | 2/2006 | Garcia ......................... 379/88.18 |
| 7,010,106 B2 | 3/2006 | Gritzer et al. ............. 379/202.01 |
| 7,010,109 B2 | 3/2006 | Gritzer et al. ............. 379/202.01 |
| 7,010,275 B2 | 3/2006 | Davies ......................... 455/90.2 |
| 7,013,279 B1 | 3/2006 | Nelson .......................... 704/270 |
| 7,031,700 B1 | 4/2006 | Weaver et al. ................ 455/420 |
| 7,035,385 B2 | 4/2006 | Levine et al. ............... 379/88.23 |
| 7,058,168 B1 | 6/2006 | Knappe et al. ............. 379/204.01 |
| 7,079,857 B2 * | 7/2006 | Maggenti et al. ............. 370/447 |
| 7,218,663 B1 | 5/2007 | Yokota et al. |
| 7,328,243 B2 | 2/2008 | Yeager et al. ................. 709/205 |
| 7,505,755 B2 | 3/2009 | Tanaguchi et al. |
| 2001/0028321 A1 | 10/2001 | Krasner ...................... 342/357.1 |
| 2002/0013813 A1 | 1/2002 | Matsuoka ..................... 709/204 |
| 2002/0152305 A1 | 10/2002 | Jackson et al. ................ 709/227 |
| 2002/0169846 A1 * | 11/2002 | Chen et al. .................... 709/209 |
| 2002/0178364 A1 | 11/2002 | Weiss ........................... 713/182 |
| 2003/0026226 A1 | 2/2003 | Miura |
| 2003/0100326 A1 | 5/2003 | Grube et al. .................. 455/515 |
| 2003/0119540 A1 | 6/2003 | Mathis |
| 2004/0054428 A1 | 3/2004 | Sheha et al. .................... 700/56 |
| 2004/0070515 A1 * | 4/2004 | Burkley et al. ........... 340/825.49 |
| 2004/0139320 A1 | 7/2004 | Shinohara .................... 713/168 |
| 2004/0185863 A1 | 9/2004 | Ogami ...................... 455/452.1 |
| 2004/0192353 A1 | 9/2004 | Mason et al. ................. 455/457 |
| 2004/0249949 A1 | 12/2004 | Gourraud et al. ............. 709/227 |
| 2005/0135348 A1 | 6/2005 | Staack .......................... 370/353 |
| 2005/0170844 A1 | 8/2005 | Barclay et al. ............. 455/456.1 |
| 2005/0174991 A1 | 8/2005 | Keagy .......................... 370/352 |
| 2005/0232207 A1 * | 10/2005 | Antoniadis et al. ........... 370/338 |
| 2005/0265256 A1 * | 12/2005 | Delaney ........................ 370/254 |
| 2006/0035657 A1 * | 2/2006 | Lim .............................. 455/518 |
| 2006/0063551 A1 | 3/2006 | Martin et al. |
| 2006/0114847 A1 * | 6/2006 | Dssouli et al. ................ 370/261 |
| 2006/0118636 A1 | 6/2006 | Miles et al. ................... 235/472 |
| 2006/0165060 A1 | 7/2006 | Dua ............................. 370/352 |
| 2006/0209871 A1 | 9/2006 | Blasco Claret et al. ....... 370/437 |
| 2006/0211426 A1 | 9/2006 | Costa et al. |
| 2006/0294243 A1 | 12/2006 | Kuure et al. ................... 709/227 |
| 2007/0030144 A1 | 2/2007 | Titus et al. .................... 340/534 |
| 2007/0049314 A1 | 3/2007 | Balachandran et al. ...... 455/518 |
| 2007/0060144 A1 * | 3/2007 | Mills et al. .................... 455/445 |
| 2007/0115848 A1 | 5/2007 | Chean et al. .................. 370/252 |
| 2007/0184814 A1 * | 8/2007 | Hamilton .................. 455/404.1 |
| 2007/0202907 A1 | 8/2007 | Shaffer et al. ................. 455/518 |
| 2007/0233802 A1 | 10/2007 | Kulkarni ....................... 709/207 |
| 2008/0037461 A1 * | 2/2008 | Biltz et al. .................... 370/328 |
| 2008/0159128 A1 | 7/2008 | Shaffer et al. ................. 370/229 |
| 2008/0167049 A1 | 7/2008 | Karr et al. ..................... 455/456 |
| 2009/0040021 A1 | 2/2009 | Seo et al. ..................... 340/10.1 |

FOREIGN PATENT DOCUMENTS

| | | | |
|---|---|---|---|
| WO | WO 02/074051 | 11/2001 | .............. H04Q 7/22 |
| WO | WO 02/074051 | 9/2002 | |

OTHER PUBLICATIONS

Network Solution:, Information Sheet, NetworkFirst, M/A-COM, Inc., http://www.networkfirst.com/features/solution, 2 pages.

It's Our Network That Makes the Difference, Information Sheet, OpenSky Network, M/A-COM, Inc., http://www.opensky.com/network/index.asp, 2 pages.

Network Management, Information Sheet, OpenSky Network, M/A-COM, Inc., http://www.opensky.com/network/netmgmtsys.asp, 2 pages.

ACU-1000™ Interoperability NOW™, Information Sheet, Raytheon JPS Communications, http://www.jps.com/downloads/PDFS/acuupgrade.pdf, 4 pages.

Interoperability Gateway, OpenSky, NetworkFirst, P25$^{IP}$, Data Sheet, M/A-COM, Inc. ECR-7054, http://www.opensky.com/network/7054.pdf, 2 pages.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages.

J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.

OnStar Technology, Information Sheet, OnStar Corp., http://www.onstar.com/us_english/jsp/explore/onstar_basics/technology.jsp, 3 pages, 2005.

Cisco IP Interoperability and Collaboration System, Q&A, Copyright © Cisco Systems, Inc. www.cisco.com, 4 pages.

Cisco IPICS, Solution Overview, Copyright © Cisco Systems, Inc., www.cisco.com/go/ipics, 6 pages.

Matthews, et al., *A New Interoperability Paradigm A Concept Proposal*, Mar. 2006, Worcester Polytechnic Institute, WPI Bioengineering Institute (Mar. 2006), 15 pages.

U.S. Appl. No. 11/149,041 entitled, *"Method and System for Communicating Using Position Information,"* inventors Shmuel (nmi) Shaffer et al., Jun. 8, 2005.

U.S. Appl. No. 11/201,832, entitled, *"Method and System for Automatic Configuration of Virtual Talk Groups Based on Location of Media Source,"* inventors Shmuel (nmi) Shaffer et al., Aug. 10, 2005.

U.S. Appl. No. 11/202,400, entitled, *"Method and System for Communicating Media Based on Location of Media Source,"* inventors Shmuel (nmi) Shaffer et al., Aug. 10, 2005.

U.S. Appl. No. 11/202,403, entitled, *"Method and System for Providing Interoperable Communications With Location Information,"* inventors Shmuel (nmi) Shaffer, et al., Aug. 10, 2005.

U.S. Appl. No. 11/214,582, entitled *"Method and System for Conveying Media Source Location Information,"* inventors Shmuel (nmi) Shaffer et al., Aug. 29, 2005.

(56) References Cited

OTHER PUBLICATIONS

U.S. Appl. No. 11/364,146, entitled, *"Method and System for Providing Interoperable Communications with Congestion Management,"* inventors Shmuel (nmi) Shaffer et al., Feb. 27, 2006.
U.S. Appl. No. 11/365,113, entitled, *"Method and System for Providing Interoperable Communications with Dynamic Event Area Allocation,"* inventors Shmuel (nmi) Shaffer et al., Feb. 28, 2006.
Shaffer, et al., U.S. Appl. No. 11/382,496, filed May 10, 2006, *Providing Multiple Virtual Talk Group Communication Sessions*, Mar. 10, 2006.
Kalley, et al., U.S. Appl. No. 11/383,998, filed May 18, 2006, *Providing Virtual Talk Group Communication Sessions in Accordance with Endpoint Resources*, May 18, 2006.
Shaffer, et al., U.S. Appl. No. 11/421,994, filed Jun. 2, 2006, *Method and System for Joining a Virtual Talk Group*, Jun. 2, 2006.
Shaffer, et al., U.S. Appl. No. 11/421,999, filed Jun. 2, 2006, *Method and System for Managing a Plurality of Virtual Talk Groups*, Jun. 2, 2006.
Shaffer, et al., U.S. Appl. No. 11/617,019, filed Dec. 28, 2006, *Method and System for Providing Congestion Management within a Virtual Talk Group*, Dec. 28, 2006.
Shaffer et al., U.S. Appl. No. 11/746,960, filed May 10, 2007, *Method and System for Handling Dynamic Incidents*, May 10, 2007.
Shaffer, et al., U.S. Appl. No. 11/550,234, filed Oct. 17, 2006, *Method and System for Providing an Indication of a Communication*, Oct. 17, 2006.
PCT Notification of Transmittal of the International Search Report and the Written Opinion of the International Searching Authority, or the Declaration, mailed Feb. 27, 2007, corresponding to PCT/US06/30447 filed Aug. 3, 2006 (20 pages), Feb. 27, 2007.
PCT Notification of Transmittal of the International Search Report and the Written Opinion of the International Searching Authority, or the Declaration, mailed Apr. 9, 2007, corresponding to PCT/US06/30294 filed Aug. 2, 2006 (20 pages), Apr. 9, 2007.
NetworkFirst Interoperability Solved, Data Sheet, M/A-COM, Inc., ECR-7018A, http://www.networkfirst.com/resources/pdf/NetworkFirstRevised5_03.pdf, 6 pages, May 2003.
Network Solution:, Information Sheet, NetworkFirst, M/A-COM, Inc., http://www.networkfirst.com/features/solution, 2 pages, 2003.
ACU-1000™ Interoperability NOW™, Information Sheet, Raytheon JPS Communications, http://www.jps.com/downloads/PDFS/acuupgrade.pdf, 4 pages, Mar. 2004.
Interoperability Gateway, OpenSky, NetworkFirst, P25$^{IP}$, Data Sheet, M/A-COM, Inc. ECR-7054, http://www.opensky.com/network/7054.pdf, 2 pages, May 2003.
C3 Maestro$^{IP}$ Dispatch Console, OpenSky, NetworkFirst, P25$^{IP}$, Data Sheet, M/A-COM, Inc. ECR- 7160A, http://www.opensky.com/network/7160.pdf, 2 pages, Oct. 2003.
V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, Oct. 2004.
Cisco IP Interoperability and Collaboration System, Q&A, Copyright © Cisco Systems, Inc. www.cisco.com, 4 pages, Oct. 2005.
Cisco IPICS, Solution Overview, Copyright © Cisco Systems, Inc., www.cisco.com/go/ipics, 6 pages, Oct. 2005.
MRT Urgent Communications: Service, Safety, Security, M/A-Com Emphasizes Power of IP in Seven Announcements at APCO, Aug. 18, 2002, 6 pages. http://mrtmag.com/products/new/radio_macom_emphasizes_power, Aug. 18, 2002.
Jim McKay, *Government Technology*, "Intact Amid Chaos", Mar. 2005, 2 pages, Mar. 2005.
Ian Hoffman, *Oakland Tribune*, "Oakland's New Radios Pass Test, City, Regional Agencies Get Green Light to Buy Public-Safety Equipment," 2007, 2 pages (reprinted by Tyco Electronics and available at http://www.macom-wireless.com/news/oaklands%20new%20radios.asp), Mar. 11, 2005.

MRT Urgent Communications: Service, Safety, Security, "5 for '05 Technologies," Dec. 1, 2004, 9 pages. http://mrtmag.com/mag/radio_technologies, Dec. 1, 2004.
MRT Urgent Communications: Service, Safety, Security, John Facella, "ROIP Success Is in the Details," Dec. 1, 2004, 3 pages. http://mrtmag.com/mag/radio_roip_success_details/, Dec. 1, 2004.
Ann Imse, *Rocky Mountain News*, "Radio Breakthrough for Cops, Firefighters," Dec. 10, 2004, 2 pgs., Dec. 10, 2004.
*First Responder Communications*, A Supplement to MRT and Fire Chief, "IP Opens Eyes," Aug. 2004, 5 pages, Aug. 2004.
*MRT, Mobile Radio Technology*, "IP Evangelist," Apr. 2004, 4 pages, www.iwce-mrt.com, Apr. 2004.
Ron Bender, et al., *MRT; Mobile Radio Technology* "Multiple Choices for Critical Communications," Oct. 2001, 4 pages, www.mrtmag.com, Oct. 2001.
Jay Herther, et al., *MRT; Mobile Radio Technology*, "Voice-over-Interintranet Protocol for Critical Communications," Aug. 2001, 4 pages, www.mrtmag.com, Aug. 2001.
*What's New in Radio Communications*, Aug./Sep. 2001, vol. 14 No. 1, Inside: Marine Radio, 2 pages, www.westwick-farrow.com.au, Aug. 9, 2001.
Rivero-Angeles, Mario et al., *Random-Access Control Mechanism Using Adaptive Traffic Load in ALOHA and CSMA Strategies for EDGE*, May 2005, IEEE Transactions on Vehicular Technology, Vo. 54, No. 3, 2 (1161) May 2005.
Shaffer et al., U.S. Appl. No. 11/364,146, filed Feb. 27, 2006, Communication from the U.S. Patent and Trademark Office mailed Oct. 14, 2008.
Shaffer et al., U.S. Appl. No. 11/364,146, filed Feb. 27, 2006, Communication from the U.S. Patent and Trademark Office mailed Mar. 26, 2009.
Shaffer et al., U.S. Appl. No. 11/617,019, filed Dec. 28, 2006, Communication from the U.S. Patent and Trademark Office mailed May 14, 2009.
Shaffer et al., U.S. Appl. No. 11/364,146, filed Feb. 27, 2006, Communication from the U.S. Patent and Trademark Office mailed Oct. 28, 2009.
Shaffer et al., U.S. Appl. No. 11/617,019, filed Dec. 28, 2006, Communication from the U.S. Patent and Trademark Office mailed Nov. 18, 2009.
Shaffer et al., U.S. Appl. No. 11/364,146, Office Action from the U.S. Patent and Trademark Office dated Mar. 11, 2010.
Shaffer et al., U.S. Appl. No. 11/617,019, Office Action from the U.S. Patent and Trademark Office dated Mar. 26, 2010.
Shaffer et al., U.S. Appl. No. 11/364,146, Final Office Action from the U.S. Patent and Trademark Office dated Sep. 1, 2010.
Shaffer et al., U.S. Appl. No. 11/617,019, Office Action from the U.S. Patent and Trademark Office dated Oct. 19, 2010.
Communication from The Patent Office of the People's Republic of China, The Second Office Action regarding Appln. 200780011091.7, Date of issue Nov. 25, 2010.
Shaffer et al., U.S. Appl. No. 11/364,146, "Method and System for Providing Interoperable Communication with Congestion Management," Office Action from the U.S. Patent and Trademark Office dated Mar. 15, 2011.
Shaffer et al., U.S. Appl. No. 11/617,019, "Method and System for Providing Congestion Management within a Virtual Talk Group," Office Action from the U.S. Patent and Trademark Office dated Apr. 15, 2011.
Communication from The Patent Office of the People's Republic of China, The Third Office Action mailed Aug. 12, 2011 regarding Appln. 200780011091.7, Date of issue Nov. 25, 2010 (English and Chinese versions), Aug. 12, 2011.
Communication to the U.S. Patent and Trademark Office re U.S. Appl. No. 11/364,146, mailed Jun. 15, 2011.
Communication to the U.S. Patent and Trademark Office re U.S. Appl. No. 11/617,019, mailed Jul. 11, 2011.

(56) References Cited

OTHER PUBLICATIONS

Communication from the U.S. Patent and Trademark Office re U.S. Appl. No. 11/617,019, dated Oct. 17, 2011.

Communication from The Patent Office of the People's Republic of China, Office Action regarding Appln. 200780011091.7, date of issue Jan. 6, 2012 (English and Chinese versions), Jan. 6, 2012.

Communication from European Patent Office regarding Appln. PCT/US2007065938 mailed Aug. 23, 2013.

European Patent Office, Communication Pursuant to Article 94(3) EPC for Patent Application No. 07 760 080.7-1862, dated Mar. 19, 2014, 4 pages.

First Examination Report issued by the Government of India Patent Office for Application No. 8473/DELNP/2008, Dec. 17, 2014.

* cited by examiner

METHOD AND SYSTEM FOR MANAGING VIRTUAL TALK GROUPS

TECHNICAL FIELD OF THE INVENTION

This invention relates in general to communication systems and, more particularly, to a method and system for managing virtual talk groups.

BACKGROUND OF THE INVENTION

Many public and private groups, such as security and safety personnel (e.g., police, fire fighters and ambulance drivers) use various communication networks of differing technologies and types for communication. Many networks utilize land mobile radios communicating through push-to-talk technologies. However, communications among different endpoints of different networks such as endpoints of different police, fire or other security networks may be difficult. Collaboration between the different agencies and networks tends to be ad hoc and inefficient. When achieved, it often involves laborious manual intervention. Organizations working towards interoperability solutions include Raytheon JPS Communications, IP Blue, Twisted Pair, M/A-COM, Motorola and Cisco Systems.

SUMMARY OF THE INVENTION

The present invention provides a method and system for managing virtual talk groups that substantially eliminates or reduces at least some of the disadvantages and problems associated with previous methods and systems.

In accordance with a particular embodiment, a method for managing virtual talk groups includes facilitating communications from a plurality of endpoints via an interoperability system. The plurality of endpoints comprise endpoints of different communication networks. The method includes configuring a virtual talk group comprising a first group of the plurality of endpoints and assigning to at least one endpoint of the first group of the plurality of endpoints of the virtual talk group functionality with respect to the interoperability system based on a relative priority of the at least one endpoint to other endpoints of the first group of the plurality of endpoints.

The virtual talk group may be associated with an event. Assigning to the at least one endpoint of the first group of the plurality of endpoints of the virtual talk group functionality with respect to the interoperability system may comprise assigning to the at least one endpoint of the first group of the plurality of endpoints of the virtual talk group functionality with respect to the interoperability system based on a type of the event. The method may include monitoring a change in the event and reassigning to the at least one endpoint of the first group of the plurality of endpoints of the virtual talk group functionality with respect to the interoperability system based the change in the event. The change in the event may comprise a change in severity of the event. The method may include adding one or more additional endpoints of the plurality of endpoints to the virtual talk group based on the change in severity of the event, determining a required level of user based on the event and adding to the virtual talk group an endpoint of the plurality of endpoints based on the required level of user.

In accordance with another embodiment, a system for managing virtual talk groups includes a processor operable to facilitate communications from a plurality of endpoints via an interoperability system, the plurality of endpoints comprising endpoints of different communication networks and configure a virtual talk group comprising a first group of the plurality of endpoints. The processor is also operable to assign to at least one endpoint of the first group of the plurality of endpoints of the virtual talk group functionality with respect to the interoperability system based on a relative priority of the at least one endpoint to other endpoints of the first group of the plurality of endpoints.

Technical advantages of particular embodiments include systems and methods for managing virtual talk groups that enables policies and procedures to be set with an interoperability system that facilitates interoperable communications among various endpoints to allow functionality and tasks with respect to the system to be automatically assigned to users of virtual talk groups based on priority of the users. In addition, the talk groups may be associated with events, and changes in the events may trigger changes in assigned functionality. Moreover, particular detected events may automatically lead to the inclusion of particular levels of users in a virtual talk group in order to be able to adequately respond to the event.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
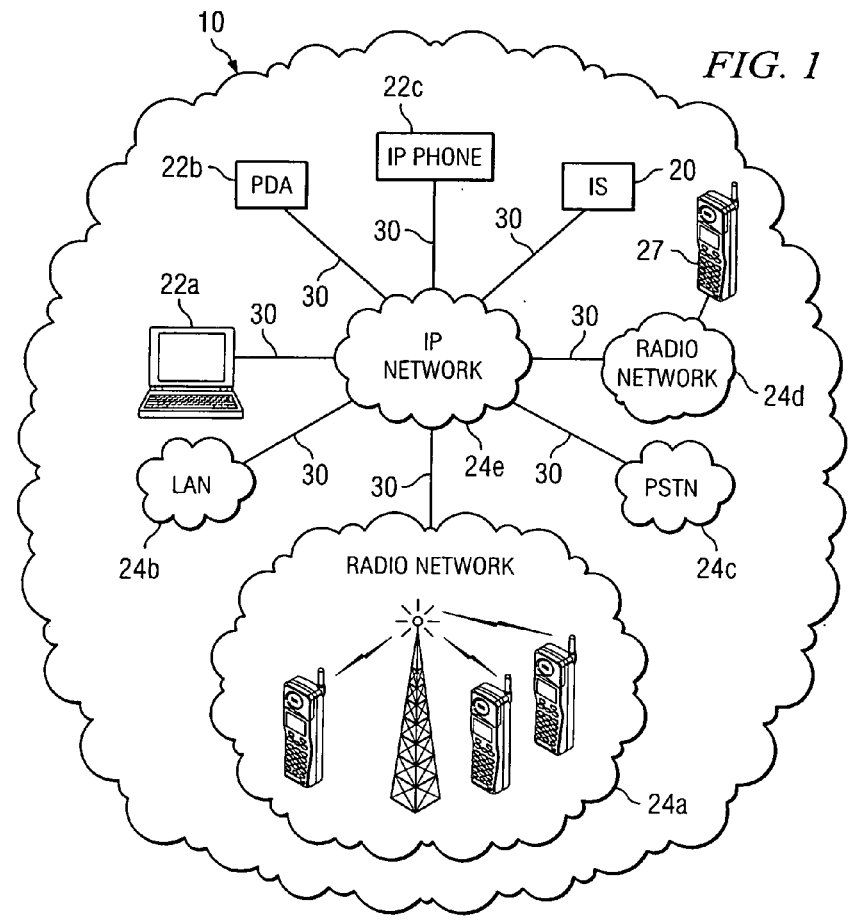
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24*a*-24*e*, interoperability system (IS) 20 and endpoints 22*a*-22*c* and 27. IS 20 facilitates interoperable communication sessions between and among various communication devices, such as endpoints of communication networks 24 and endpoints 22 and 27. IS 20 uses a systems approach to offer a framework based on IP protocols and services to immediately achieve secure voice, video and other data interoperability among communication endpoints and networks utilizing different technologies.

Particular embodiments enable policies and procedures to be set with an interoperability system to allow functionality and tasks with respect to the system to be automatically assigned to users of virtual talk groups based on priority of the users. In addition, the talk groups may be associated with events, and changes in the events may trigger changes in assigned functionality. Moreover, particular detected events may automatically lead to the inclusion of particular levels of users in a virtual talk group in order to be able to adequately respond to the event.

In the illustrated embodiment, communication networks 24a and 24d comprise radio networks (RNs), communication network 24b comprises a local area network (LAN), communication network 24c comprises a PSTN and communication network 24e comprises an IP network. It should be understood, however, that communication system 10 may comprise any number of IP or non-IP communication networks of any wireless or wireline form capable of communicating audio and/or video telecommunication signals, data, and/or messages, including signals, data or messages. Communication networks 24a-24e may include any number and combination of segments, nodes and endpoints to enable communication among network devices and components. Communication networks 24a-24e may be distributed locally or across multiple cities and geographic regions. Nodes may include any combination of network components, gatekeepers, call managers, conference bridges, routers, hubs, switches, gateways, base stations, endpoints or other hardware, software or embedded logic implementing any number of communication protocols that allow for the exchange of data in communication system 10. Segments 30, which may comprise any suitable wireless or wireline communication links, including one or more communication networks (e.g., WANs) as appropriate, couple various networks with each other and with endpoints 22 and IS 20. In particular embodiments, segments may include gateways for facilitating communication between various networks, such as an LMR gateway between radio network 24a and IP network 24e.

In some cases, users of endpoints of one of communication networks 24a-24e may communicate with endpoints of another of communication networks 24a-24e through IS 20. A radio network, such as radio network 24a or 24d, may support communication among portable mobile station endpoints, such as land mobile radios (LMRs), using any suitable communication methods or features, such as cellular and push-to-talk (PTT). Communication networks 24a-24e may comprise networks of particular groups or agencies (e.g., a municipality's police department network), whether operational with respect to a particular area or otherwise.

IS 20 enables, facilitates and/or provides for interoperable communication among communication endpoints and devices, such as LMRs, cellular phones, IP phones, PCs, PDAs, PSTN phones, video monitors, cameras and sensors of one or more communication networks (e.g., communication networks 24a-24e) using Internet Protocol. Such endpoints may comprise IP or non-IP-enabled endpoints. In particular embodiments, IS 20 may control gateways (for example, of segments 30) in order to map radio frequencies of particular mobile radio endpoints to IP addresses for communication to other types of radio endpoints or IP devices. For example, a particular gateway may be able to receive communications from various types of endpoints (e.g., on various types of communication networks) and may convert such communications for transmission to other types of endpoints. IS 20's control of the gateway may control the various endpoints and/or networks that receive particular communications, depending on system functionality and configuration as further discussed below. As indicated, such control may include the mapping of communications and endpoints to IP addresses for interoperable communication. In some embodiments, IS 20 may host audio conferences that bridge communications received from endpoints. As indicated above, communication system 10 (including IS 20) may include any suitable number or type of gateways (e.g., LMR and PSTN gateways), servers (e.g., multipoint conference servers), switches, routers, firewalls, access points, processors, memory or other hardware, software or encoded logic to provide functionality described herein. IS 20 is coupled to communication networks 24a-24d and endpoints 22 through IP network 24e, which may comprise any suitable IP network.

As indicated above, IS 20 uses IP to enable communication among endpoints of various networks. The manner in which IS 20 facilitates communications among endpoints may vary according to location and system or operational needs. For example, IS 20 may communicate with endpoints using multicast IP addresses assigned to an endpoint of a communication network, a group of endpoints of a communication network or one or more endpoints of multiple communication networks or alternatively using a peer to peer dialed connection or a nailed dialed connection. A group of endpoints may be combined into a virtual talk group for communication using a particular IP address. As an example, the virtual talk group may be assigned a multicast IP address through which users of various endpoints may communicate on the talk group. The use of multicast IP addresses allows IS 20 to facilitate communications among communication devices and endpoints of various communication networks to provide audio, data, video and control network interoperability. As an additional example, in some cases multicast streams (e.g., utilizing multicast IP addresses) may be used. In some cases nailed dialed connections, such as those using SIP protocol, may be used for communication among endpoints and with IS 20. Various embodiments may combine communication methods to facilitate communication among endpoints. For example, in some cases certain endpoints of a virtual talk group may participate in the talk group through a multicast IP address while other endpoints may utilize a nailed SIP connection. IS 20 may control this participation, such as by controlling gateways, multipoint conferences and the mapping of communications to IP addresses.

IS 20 may be utilized and implemented in any number of market segments, such as enterprise safety and security (e.g., loss prevention), transportation, retail, public safety and federal agencies in order to provide radio and non-radio network interoperability within and between such market segments. As indicated above, such network interoperability includes the interoperability of push-to-talk voice technology within various networks and the interoperability between push-to-talk and full duplex dialed connections.

It will be recognized by those of ordinary skill in the art that endpoints 22 and 27 and IS 20 may be any combination of hardware, software, and/or encoded logic that provides communication services to a user. In the illustrated embodiment, endpoints 22 comprise a PC (endpoint 22a), a PDA (endpoint 22b) and an IP phone 22c) and endpoint 27 comprises a land mobile radio (LMR). However, in other embodiments, endpoints 22 may include a telephone, a personal computer (PC), a video monitor, a camera, an IP phone, a cell phone, a personal digital assistant (PDA), a command center or any other communication hardware, software and/or encoded logic that supports the communication of audio, video or other data, using packets of media (or frames) or otherwise, through communication system 10. Endpoints 22 as well as endpoints and components of communication networks 24 (e.g., endpoint 27) may be capable of communicating using any particular type of technology, such as cellular, IP, PSTN, CDMA, GSM, TDMA and satellite. Endpoints 22 and 27 and IS 20 may also include unattended or automated systems, gateways, other intermediate components or other devices that can establish media sessions.

Although the illustrated embodiment includes five communication networks 24a-24e, the term "communication network" should be interpreted as generally defining any network capable of transmitting audio and/or video telecommunication signals, data, and/or messages, including signals, data or messages. Any one of networks 24a-24e may be implemented as a local area network (LAN), wide area network (WAN), cellular network, global distributed network such as the Internet, Intranet, Extranet, PSTN, LMR network, CDMA network, GSM network, TDMA network, satellite network or any other form of wireless or wireline communication network.

Communications over communication networks 24a-24e may use any suitable communication protocol. In a particular embodiment, some communication networks may employ voice communication protocols that allow for the addressing or identification of endpoints, nodes, and/or other components coupled to the communication network. For example, using Internet protocol (IP), each of the components coupled together by, for example, communication network 24b in communication system 10 may be identified in information directed using IP addresses. In this manner, network 24b may support any form and/or combination of point-to-point, multicast, unicast, or other techniques for exchanging media packets among components in communication system 10. Any network components capable of exchanging audio, video, or other data are included within the scope of the present invention.

Since IP networks share a common method of transmitting, data, telecommunication signals may be transmitted between telephony devices located on different, but interconnected, IP networks. In addition to being coupled to other IP networks, communication network 24b may also be coupled to non-IP telecommunication networks, for example through the use of interfaces or components, including gateways. In the illustrated embodiment, communication network 24b may be coupled with PSTN 24c through a gateway. In some embodiments the gateway may be a part of IS 20 or network 24e. PSTN 24c includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 24c), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, one or more of endpoints 22, and endpoints and components of communication networks 24 may be IP telephony devices capable of participating in IM, video, and other multimedia communication sessions. IP telephony devices have the ability of encapsulating a user's voice (or other input) into IP packets so that the voice can be transmitted over a communication network. IP telephony devices may include telephones, fax machines, computers running telephony software, nodes, gateways, wired or wireless devices, hand held PDAs, or any other device capable of performing telephony functions over an IP network.

In particular embodiments, communication system 10 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Although FIG. 1 illustrates a particular number and configuration of endpoints, IS and communication networks, communication system 10 contemplates any number or arrangement of such components for communicating media.

Figure 2:
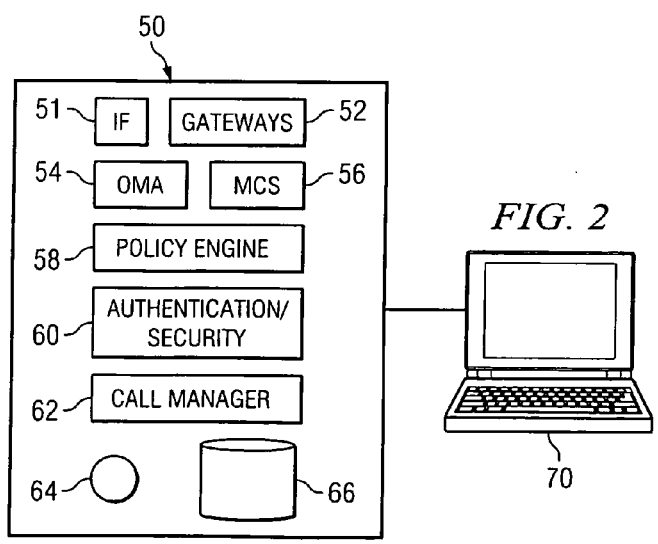
FIG. 2 illustrates an example interoperability system, in accordance with a particular embodiment.

FIG. 2 illustrates interoperability system (IS) 50, in accordance with a particular embodiment. IS 50 may be similar to and provide the same functionality as IS 20 of FIG. 1. In the illustrated embodiment, IS 50 includes interface 51, gateways 52, operations management application (OMA) 54, multipoint conference system (MCS) 56, policy engine 58, authentication and security system 60, call manager 62, processor 64 and memory module 66, which may include logic embodied in a computer readable medium. IS 50 is coupled to a PC endpoint 70 that may be used to access, configure and control various functionality provided by IS 50. PC endpoint 70 may run a client application for such access, configuration and control. In some embodiments, endpoint 70 may utilize a web based thin client for configuring and controlling IS 50. The client application may enable a user of endpoint 70 to receive and monitor communications from various endpoints and virtual talk groups. In particular embodiments, other types of endpoints may be utilized to access, configure and control IS 50, such as IP phones, PDAs and mobile devices. IS 50 may be coupled to such endpoints (including PC endpoint 70) through one or more communication networks.

Interface 51 is used in the communication of audio, video, signaling and other data between IS 50 and other network components. For example, interface 51 may receive communications from endpoints such as endpoints of communication networks 24, endpoints 22 and 27 and endpoint 70. The communication may take place over IP networks thereby negating the need for dedicated wiring between the endpoints and the IS.

Gateways 52 may include any suitable gateways to provide network interoperability and back-end legacy application integration, such as LMR gateways, PSTN gateways and application gateways. Gateways 52 provide mapping between IP services and the interoperable networks, such as LMR network 24a of FIG. 1. In some cases gateways 52 may not be located within an IS but may be distributed throughout a communication system for enabling communications among various communication networks.

Operations management application (OMA) 54 includes functionality for configuration, management and control of IS 50, including conference and collaboration management, and may be accessed by a user via, for example, PC endpoint 70. In particular embodiments, OMA 54 may enable a user, such as dispatch personnel or administrators or a mobile user (e.g., a first responder mobile user) accessing IS 50 via a mobile endpoint, the ability to configure, manage and participate in one or more virtual talk groups and ad hoc conferences simultaneously. In particular embodiments, OMA 54 may be accessed through a web interface, functioning for example as a soft phone for radios. A screen display may be controlled using a mouse, keypad, touch screen, voice commands or any other suitable interface. OMA 54 screens may include any number of functional controls to provide interoperable communications. OMA 54 may authenticate a user and obtain user configuration information upon a user accessing the OMA. OMA 54 may monitor and provide communication ability for any number of channels at one time to provide the ability for an OMA user to communicate on and control multiple virtual talk groups at once.

Multipoint conference system (MCS) 56 provides collaboration and conference services for multiple endpoints of one or more networks. For example, users of multiple endpoints (such as LMRs of different networks (e.g., networks of different agencies or groups) and different types of endpoints of different networks) may be bridged together through MCS 56 to provide virtual talk group communications. MCS 56 may include any suitable number or type of conference bridges, ports, digital signal processors or other components to facilitate communications discussed herein.

Policy engine 58 includes policies for undertaking various operations and functionality upon the occurrence of various events to provide dynamic incident management. These policies may include both pre-determined and ad hoc policies. For example, upon the occurrence of a particular incident, the incident may include a unique identifier and may have basic incident attributes such as time of creation, name of user creating and status. A pre-determined policy may then be executed by an incident manager or dispatch personnel as action for the specific incident. In particular embodiments, policy engine may receive inputs from alarms and sensors to setup device agnostic communications interoperability and one-way video and data collaboration, to setup, configure and/or manage virtual talk groups, and to trigger additional events such as pagers, e-mails, notifications, dial-outs, recording and information escalation.

Authentication and security system 60 manages access, configuration and control privileges for users of IS 50 and those participating in interoperable communications. For example, different users may have different privileges assigned for interoperable communications. Some users may only have transmit or listen privileges with respect to one or more particular talk groups, while other users may have the ability to communicate in all talk groups or setup and configure various talk groups. User privileges may change dynamically upon the occurrence of particular events.

Call manager 62 maintains information regarding various users, such as users of IP networks for which interoperable communications are provided by IS 50. This facilitates in the extension of PTT to IP networks and in the provision of voice and data interoperability across radio and non-radio networks. In particular embodiments, call manager 62 may maintain a listing, table, or other organization of information about users. The information may include a name or other identifier and contact information such as phone numbers and email addresses for the users. In particular embodiments call manager 62 may represent any appropriate combination of hardware, software and/or encoded logic distributed throughout a communication network coupled with IS.

Processor 64 may be a microprocessor, controller, or any other suitable computing device, resource, or combination of hardware, software and/or encoded logic operable to provide, either alone or in conjunction with other IS components such as OMA 54, IS 50 functionality. Such functionality may include providing various features discussed herein to a user, such as a user of an endpoint accessing IS 50 through OMA 54. Such features may include providing to the user endpoint various functionality to be able to perform particular tasks with respect to the IS and to facilitate interoperable communications among various endpoints.

Memory module 66 may be any form of volatile or non-volatile memory including, without limitation, magnetic media, optical media, random access memory (RAM), read-only memory (ROM), removable media, or any other suitable local or remote memory component. Memory module 66 may store any suitable data or information, including software and encoded logic, utilized by IS 50. In particular embodiments, memory module 66 may include data for user management, talk-group management, resource pool management, privileges, backup configuration and information and/or timestamp and activity tracking.

IS 50 may also include any number of switches, routers, firewalls, mobile access routers, access points, wireless bridges and other components in order to accommodate particular operational desires and needs.

In particular embodiments such as in the LMR network interoperability context, IS 50 may, through one or more components discussed above or through other components, encode received audio with a standard audio codec, such as G.711 or G.729. Those audio samples may be packaged in standards-based real-time transport protocol (RTP), real-time transport control protocol (RTCP) or any other media transport protocol packets suitable for transport on an IP network. At this point, the communication element may be abstracted from the distinctive characteristics of each radio system. These audio packets can be sent across the network to other radio systems either individually (unicast) or as a group (multicast). The recipient of the audio packets may be a device capable of receiving and decoding the RTP stream, such as an IP telephone or PC with appropriate software. The IP network and IP-enabled devices can be used to allow users to monitor or transmit on a particular radio channel from a desk without issuing another radio.

As indicated above, IS 50 may facilitate communication among users of endpoints of various networks through virtual channels or talk groups. For example, a channel may comprise a unidirectional or bidirectional path for transmitting and/or receiving electrical or electromagnetic signals. This may comprise, for example, a conventional radio physical RF channel. A talk group in this context may be a subgroup of users (e.g., radio users) who share a common functional responsibility and typically coordinate actions amongst themselves without radio interface with other subgroups. For example, a municipality's police department network may include various talk groups.

A virtual talk group (VTG) represents interoperability of a group of channels, for example, as an audio conference or meeting. A virtual talk group may include an associated virtual channel and an ID. Virtual channels may comprise an address, such as an IP address, associated with a virtual talk group through which users may access the virtual talk group and/or through which communications from VTG member-endpoints are bridged. Various types of virtual talk groups may be utilized in particular embodiments, such as a multicast address usable by all endpoints of the VTG, a VTG comprising multiple talk groups (e.g., multiple radio sources from different frequencies whose communications are mixed), a unicast group and a combination unicast and multicast group.

As an example, a particular virtual talk group may comprise a conference or meeting of the following: (1) a channel or other multicast path used by certain users of a police department's radio network, (2) a channel or other multicast path used by certain users of a fire department's radio network, (3) a channel or other multicast path used by certain users of a corporation's security radio network, (4) a plurality of users of IP-enabled endpoints such as IP phones, IP-enabled PDAs or PCs and (5) telephony users who join the VTG from the public switching telephony network (PSTN) via gateway 52. An operator of IS 50 may configure the virtual talk group using any suitable interface, such as by dragging and dropping the included channels and IP endpoints into a single area representing the virtual talk group. MCS 56 may provide the functionality for the conference of the virtual talk group members. In particular embodiments, multiple talk groups may be patched together on a dynamic, as needed basis. In some cases a virtual talk group may not necessarily include communications through an IS but may instead include member endpoints whose communications are mapped to IP addresses at gateways (such as LMR gateways) controlled by an IS.

Any number of virtual talk groups may be configured to provide any suitable audio, data, video and control network interoperability. Virtual talk groups may be created using any suitable user/endpoint groups or channels based on location, organizational requirements, event requirements or any other suitable characteristic. An administrator or operator may configure channel details such as name, description, participants, multicast IP addresses, codec and latch options through, for example, OMA 54.

Figure 3:
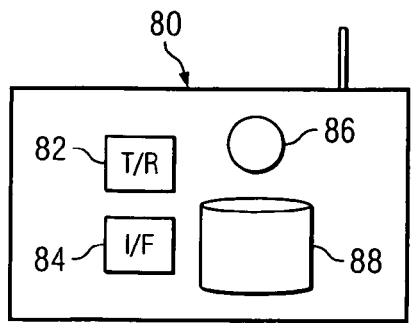
FIG. 3 illustrates an example endpoint, in accordance with a particular embodiment.

FIG. 3 illustrates an endpoint 80, which may comprise a mobile endpoint, in accordance with a particular embodiment. Endpoint 80 may be similar to, and may provide similar functionality to, other endpoints discussed herein.

In the illustrated embodiment, endpoint 80 includes a transmitter/receiver 82, a user interface 84, a processor 86 and a memory module 88. Transmitter/receiver 82 receives and transmits communications such as audio, video and other data to and from other network components. User interface 84 provides a mechanism through which a user of endpoint 80 may operate the endpoint and communicate with other network devices. Interface 84 may comprise a keypad, display, touch screen, audio input or any other suitable interface. Instructions may be submitted through speech recognition, collection of keystrokes, soft key or otherwise.

Processor 86 may be a microprocessor, controller, or any other suitable computing device, resource, or combination of hardware, software and/or encoded logic operable to perform endpoint functionality. Processor 86, either alone or in conjunction with other endpoint components, provides endpoint functionality discussed herein. Memory module 88 may be any form of volatile or non-volatile memory including, without limitation, magnetic media, optical media, random access memory (RAM), read-only memory (ROM), removable media, or any other suitable local or remote memory component. In particular embodiments, endpoint 80 may be used by a command officer or other user and may run a client application of IS 50.

As indicated above, particular embodiments provide the ability to recognize various users on or at a particular channel, VTG, scene or incident and assign roles and functionality with respect to IS 50 to the various users based on priority levels. Policy engine 58 and authentication and security system 60 may work together with other components of IS 50, such as processor 64, to provide this functionality. As indicated above, policy engine 58 includes policies for undertaking various operations and functionality upon the occurrence of various events to provide dynamic incident management. These policies may include both pre-determined and ad hoc policies. In addition, authentication and security system 60 manages access, configuration and control privileges for users of IS 50 and those participating in interoperable communications. Different users may have different privileges assigned for interoperable communications. Some users may only have transmit or listen privileges with respect to one or more particular talk groups, while other users may have the ability to communicate in all talk groups or setup and configure various talk groups. User privileges may change dynamically upon the occurrence of particular events. As discussed herein, the assignment of functionality to an endpoint may correspond to assignment of the functionality to the user to who may use the endpoint to perform the assigned functionality.

Figure 4:
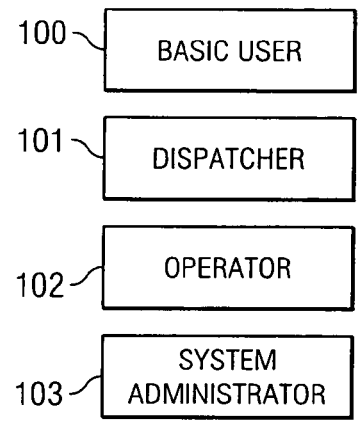
FIG. 4 illustrates example user categories used in a system for managing virtual talk groups, in accordance with a particular embodiment.

In particular embodiments, IS 50 groups its various users into a number of user categories. Each user category defines roles, functionality and limits for its respective users. FIG. 4 illustrates user categories 100-103 that may be utilized in some embodiments. The illustrated user categories include basic user category 100, dispatcher category 101, operator category 102 and system administrator category 103.

In this example, basic users, or members of basic user category 100, have the ability to participate in communications facilitated through IS 50. They may also be able to change various characteristics of their profile with respect to IS 50 and its control applications, such as their username and password on the system. Basic users may not have access to perform other, higher level functionality with the system, such as controlling which channels or VTGs on which they are able to communicate.

Dispatchers, or members of dispatcher category 101, have the capability to perform the functionality that basic users are able to perform as well as additional functionality. Such additional functionality may include the ability to manage and control VTGs, channels and their members and the ability to set various policies and/or triggers for setup of VTGs based on the occurrence of particular events. For example, dispatchers may be able to set up a VTG for a particular event, such as a fire, and may set and control rules for determining who may communicate on the VTG. Dispatchers may manually add and remove members of the VTG and may set rules and policies for the automatic addition and removal of members based on any suitable criteria, such as proximity to the event for which the VTG was established. The setup and control of VTGs may also include a determination of which members of the VTG may actually transmit communications on the VTG and which members are only allowed to listen to the VTG communications.

Operators, or members of operator category 102, have the capability to perform the functionality that basic users and dispatchers are able to perform as well as additional functionality. Such additional functionality may include the ability to add and create users of the IS and to add and create user groups. In essence, operators may perform human resources-like functionality.

System administrators, or members of system administrator category 103, have the capability to perform the functionality that basic users, dispatchers and operators are able to perform as well as additional functionality. Such additional functionality may include the ability to setup and configure multicast parameters and addresses for channels, view IS 50 activity logs, view and configure system status, view and configure licenses for ports and other components, view usage info for various components (e.g., per port, IP phone, etc.), perform database management tasks (e.g., backup and restore) and perform other functionality. The functionality of system administrators with respect to the IS is not limited. Thus, system administrators essentially may perform any tasks with respect to the system.

Figure 5:
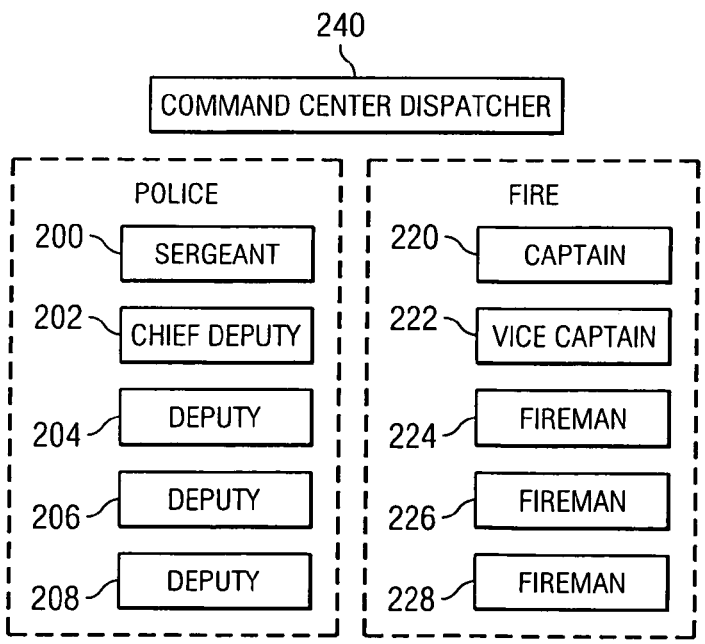
FIG. 5 illustrates example users and associated priority used in a system for managing virtual talk groups, in accordance with a particular embodiment.

FIG. 5 illustrates example users and associated priority used in a system for managing virtual talk groups, in accordance with a particular embodiment. FIG. 5 includes a number of users of IS 50 that may communicate interoperably through functionality facilitated by the IS as discussed above. FIG. 5 includes a command center dispatcher 240 and the following police department users: sergeant 200, chief deputy 202 and deputies 204, 206 and 208. FIG. 5 also includes the following fire department users: captain 220, vice captain 222 and firemen 224, 226 and 228. Users illustrated in FIG. 5 may communicate using any suitable endpoint, such as endpoints illustrated and/or described above with respect to FIGS. 1-3.

Command center dispatcher 240 may be the default dispatcher for the system and may thus have the dispatcher functionality discussed above with respect to FIG. 4, such as the ability to manage and control VTGs. Command center dispatcher may be located at a command center for the system and may access IS through PC endpoint 70. The other illustrated users may access the IS through mobile endpoints, such as vehicle PCs, PDAs, PTT radios, cell phones, mobile IP phones or any other suitable endpoint.

For purposes of this example, assume that a particular event occurs that needs the establishment of a VTG so that IS users responding to the event may communicate interoperably among each other. This event may comprise, for example, a fire, an automobile crash, a terrorist attack or any other type of event. The event VTG may be established automatically, through for example policy engine 58 and/or processor 64 of IS 50, or it may be established with some manual input, through for example command center dispatcher 240. The selection of users to be members of the VTG may be based on any of a number of factors, such as current location of users relative to an event associated with the VTG and particular resources needed for the event.

As an example of automatic creation of a VTG, assume the event is a fire in a building. Sensors in the building may detect the fire and may detect information about the fire, such as its size, strength and/or severity. The sensors may communicate this detection information to IS 50. IS 50 may, as a result, configure a VTG of response personnel needed to respond to the fire according to predefined operating procedures. In some cases, IS 50 may monitor communications of those whose communications are facilitated by IS 50 and may configure VTGs or perform other system tasks based on these communications. For example, IS 50 may analyze text of IM communications among users or utilize speech recognition to analyze spoke communications among users. IS 50 may collect information from any of a variety of sources (e.g., sensors, personnel, monitored communications, etc.) in order to configure VTGs and perform other system tasks.

Using the information collected, IS 50 may perform system tasks. For example, IS 50 may collect information regarding the presence of various users (e.g., the users indicated in FIG. 5), to determine which users should be a part of a VTG configured for an event. As information is collected (e.g., information about the spread of the fire collected from sensors and/or personnel), the IS may change the configuration of the VTG. In the fire example, the IS may add users to the VTG to respond to the fire as the fire spreads.

In this example, IS 50 sets up a VTG for the fire event and includes in the VTG deputies 204 and 206, chief deputy 202, firemen 224 and 226 and captain 220. These particular users may be selected for the event VTG and to respond to the VTG for any of a variety of reasons. For example, some may have a particular skill needed at the event and some may already be in close proximity to the event. These users that are selected are members of at least two different communication networks (e.g., the police department users communicate on a police department communication network and the fire department users communicate on a fire department communication network). Since they are now members of the same VTG, they can communicate interoperably through facilitation provided by IS 50 as generally described with respect to facilitation of interoperable communications discussed above. Command center dispatcher 240 having dispatcher functionality may also aid in configuring the VTG and/or perform various dispatcher duties.

As indicated above, in particular embodiments IS 50 has the capability to recognize the relative rank of those on the scene and/or in the VTG and assign particular functionality based on that rank. For example, IS 50 recognizes that chief deputy 202 is the highest ranking police department user in the VTG and may thus assign functionality to him that is not given to other police department users in the VTG (deputies 204 and 206). This functionality may include, for example, dispatcher functionality as discussed with respect to FIG. 4 or authority and/or control to perform particular tasks and to give particular commands to other users in the VTG. Based on this assignment, the user may utilize his respective endpoint (e.g., endpoint 80) to perform tasks associated with the functionality assigned. IS 50 may recognize that captain 220 is the highest ranking fire department user in the VTG and may thus assign functionality to him that is not given to the lower ranked firemen 224 and 226 in the VTG. In some embodiments, a priority or ranking may be established between the users of different groups, such as between the fire department users and the police department users. For example, captain 220 of the fire department may outrank chief deputy 202 of the police department. As a result, captain 220 may be assigned functionality such that he is able to perform operations and tasks using IS 50 that chief deputy 202 is not able to perform. As another example, when captain 220 and chief deputy 202 issue control or configuration commands that may conflict with respect to a particular operation with respect to IS 50 or intend to take opposite stances on whether a particular operation should be performed, IS 50 may take the instructions of captain 220 if he outranks chief deputy 202. As indicated, IS 50 may assign roles to various VTG users based on relative ranks of those users, and such roles may include, for example, categories of functionality discussed above with respect to FIG. 4.

Various events with respect to the event, the VTG and/or the IS may alter the configuration of the VTG and/or the assignment of roles and/or functionality to members of the VTG. For example, if other users become in a position to respond to the event, the functionality assigned to current members of the VTG may change. IS 50 may also notify relevant users of the change before or as it occurs and may do so in a manner to avoid conflict and/or lack of role clarity in the process. The system may ensure that the new user assumes the functionality and takes charge, if applicable, before removing the functionality from the other user. As an example, assume that sergeant 200 arrives on the scene. IS 50 may add sergeant 200 to the event VTG and, since sergeant 200 outranks the other police department users in the VTG, IS 50 may automatically give to sergeant 200 functionality not given to other police department users in the VTG. In addition, functionality previously given to chief deputy 202 as the previous highest ranking police department user may be given to sergeant 200. IS 50 may notify chief deputy 202 of the functionality transfer. Moreover, if sergeant 200 is the highest ranking user in the VTG (e.g., including the fire department users), then IS 50 may automatically assign him functionality not given to other users. In addition, if captain 220 was the previous highest ranking user out of all users of the VTG, the functionality previously assigned to captain 220 as the highest ranking user may be automatically given to fire captain 220. The functionality assigned to users of a VTG may change depending on any particular circumstance, such as addition to or subtraction from a VTG of one or more particular users or any other circumstance. In addition, a user assigned particular functionality, such sergeant 200 assigned dispatcher functionality, may request that another user may assume his role. For example, if sergeant 200 needs to leave the VTG (e.g., because he has been called to another assignment or otherwise), he may request that another user, such as chief deputy 202 assume his functionality and take command.

In particular embodiments, IS 50 may assign functionality to users based on underlying network capabilities, parameters and/or conditions. For example, a user with better communications infrastructure support, such as bandwidth, security, signal strength or other parameter, may be selected for particular functionality over another user with inferior communications infrastructure support. In some cases such selection may be made regardless of relative priority and/or rank of the users or it may be made taking into account the relative priority and/or rank of the users. For example, even though sergeant 200 may outrank chief deputy 202, in some situations chief deputy 202 may automatically be assigned higher functionality because his communications infrastructure support is currently better than that of sergeant 200. Communications infrastructure support may be continuously monitored by IS 50 to make these determinations so as to ensure that all tasks required according to assigned functionality are able to be completed. In some situations communications infrastructure support may only be accounted for when deciding who among three equally-ranked users, such as deputies 204, 206 and 208, should receive certain functionality. Particular embodiments may utilize detected communications infrastructure support for various users in any suitable manner in the configuration of VTGs and the assignment of various roles and functionality to users.

In particular embodiments, IS 50 may, based on various predefined criteria, map a particular scene or incident to a level of decision maker required. For example, a scene or event may occur that requires the establishment and/or configuration of a VTG of responders. The event may be, for example, the fire event discussed above. The fire may require a particular level of decision maker to make decisions with respect to the VTG and/or the event. A smaller fire may require a vice captain user, such as vice captain 222. A larger fire may require a captain user, such as captain 220. Based on the level of required decision maker (which may be preconfigured in IS 50), the IS may automatically include a user having such required level in the VTG. A large, serious event for a city may require the mayor to be a member of the VTG. Similarly, a large event for a state may require the governor. As an additional example, a robbery or hostage situation may require a particular level of police officer, depending on the type and/or severity.

IS 50 may analyze the type and/or severity of event to map against preconfigured criteria for determining the level of required decision maker using any suitable method. For example, IS 50 may recognize the strength of a fire or other event or scene through sensors proximate to the location of the event or scene. IS 50 may also receive witness reports for determining the type and/or severity of an event. In addition, in particular embodiments as the type and/or severity of a particular scene or event changes over time, the level of required decision maker may change as well.

In particular embodiments, IS 50 may keep detailed reports and information concerning the changes in functionality for later audits and authentication. This may serve as a check to make sure each user is performing the tasks required based on assigned functionality.

It will be recognized by those of ordinary skill in the art that endpoints and interoperability systems disclosed herein are merely example configurations in accordance with particular embodiments. These systems may include any number of interfaces, processors, memory modules, and other components to accomplish the functionality and features described herein. In addition, these components and other desired components for performing the above described functionality may be centrally located (local) with respect to one another, or distributed throughout communication systems and networks. In addition, one or more components of these systems and devices may work together in performing various functionality described herein.

Figure 6:
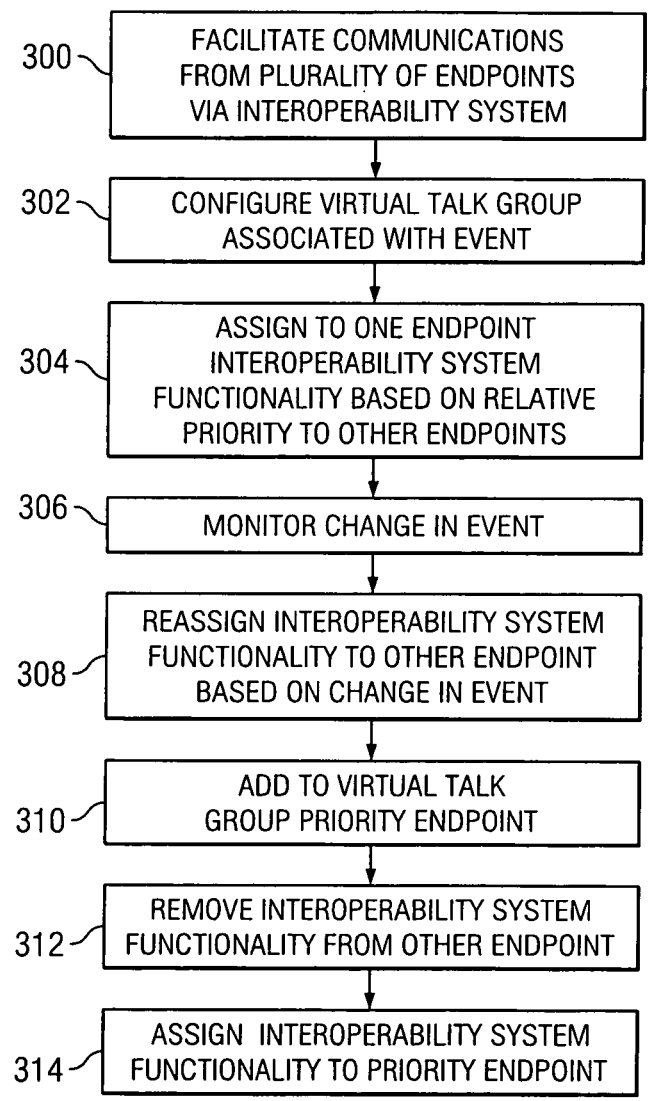
FIG. 6 illustrates a method for managing virtual talk groups, in accordance with a particular embodiment.

FIG. 6 is a flowchart illustrating a method for managing virtual talk groups, in accordance with a particular embodiment. The method begins at step 300 where communications from a plurality of endpoints are facilitated via an interoperability system. The communications may be transmitted from endpoints of various different communication networks, such as police and fire PTT communication networks. It should be understood that for purposes of the descriptions and claims herein, whenever a VTG is described as comprising a plurality of endpoints of different communication networks, in addition to including at least some endpoints of different communication networks, the VTG may also include some endpoints of the same communication network. For example, the VTG may include a plurality of endpoints of the same police department network in addition to one or more endpoints of other communication networks, such as other police or fire department or private company networks. Moreover, in some cases, endpoints of different communication networks may include endpoints that are communicating on different channels or frequencies. The different communication networks may comprise networks of different technologies, such as IP, cellular, PSTN, LMR, CDMA, GSM, TDMA, GPRS and satellite. In particular embodiments, at least some of the endpoints of the virtual talk groups may communicate through PTT technology. In addition, some of the endpoints may comprise IP endpoints. Moreover, the different communication networks may comprise networks of various safety and security agencies, whether public or private as well as networks of public and private groups, companies or organizations. The communications may be received at an interoperability system and/or at a client application of an interoperability system.

The communications may be received via a multicast stream whose header includes the location information or via a unicast stream with the location information. The virtual talk groups may include communications (from the various endpoints) that are facilitated by an IS by mapping the communications to a multicast IP address or by bridging the communications at a multipoint conference system of the IS.

At step 302, a virtual talk group comprising a group of the plurality of endpoints is configured by the interoperability system to enable the endpoints in the group to communicate with each other. The group may be configured in association with an event, such as a security event, a fire, a robbery, a terrorist attack or another type of event.

At step 304, functionality with respect to the interoperability system is assigned to one of the virtual talk group endpoints based on a relative priority of the endpoint to other endpoints in the group. For example, a user of one endpoint may have a higher rank than users of the other endpoints. In some cases, such priority may be based on predetermined policies in the interoperability system. The functionality assigned may allow the endpoint to perform various tasks with the interoperability system that other endpoints are not allowed to perform, such as making changes to membership in the virtual talk group, creating a virtual talk subgroup of members of the virtual talk group, creating new virtual talk groups, establishing other modes of communication of the virtual talk group, changing user profiles, changing system policies and procedures, etc.

At step 306, a change in the event is monitored, for example by the interoperability system. The change may include any particular type of change associated with the event, such as a change in the event's size, type or severity. For example, a fire may become larger or more severe, or a routine robbery may become a hostage situation. Based on this change, at step 308 the functionality with respect to the interoperability system is reassigned to another endpoint. For example, the functionality may be reassigned to an endpoint user with more responsibility or a higher ranking if the event change comprised the event becoming bigger, more severe or more dangerous.

At step 310, a priority endpoint is added to the virtual talk group. A priority endpoint may include an endpoint user having a higher priority or higher ranking than other endpoints in the virtual talk group. The priority endpoint may be added based on the event (e.g., changes in the event), based on the location of the priority endpoint with respect to event (e.g., the priority endpoint becoming closer to the event) or for any other suitable reason. Based on the addition of the priority endpoint, at step 312 the previous functionality assigned may be removed from the endpoint to which it was assigned and may be assigned at step 314 to the priority endpoint. This assignment may allow the priority endpoint to perform functionality with respect to the interoperability system as discussed above and with respect to step 304.

Some of the steps illustrated in FIG. 6 may be combined, modified or deleted where appropriate, and additional steps may also be added to the flowcharts. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for managing virtual talk groups, comprising:
  facilitating communications from a plurality of endpoints via an interoperability system, the plurality of endpoints comprising a first mobile endpoint using a first radio frequency and a second mobile endpoint using a second radio frequency different than the first radio frequency wherein each endpoint of the plurality of endpoints is associated with a communications infrastructure;
  relaying at least a first communication from the first mobile endpoint to the second mobile endpoint through the interoperability system;
  configuring a virtual talk group comprising a first group of the plurality of endpoints;
  determining one or more communications infrastructure support capabilities for at least one endpoint of the first group of the plurality of endpoints;
  assigning to at least one endpoint of the first group of the plurality of endpoints of the virtual talk group functionality with respect to the interoperability system based on a relative priority of the at least one endpoint to other endpoints of the first group of the plurality of endpoints and relative communications infrastructure support capabilities of the at least one endpoint compared to such capabilities of the other endpoints of the first group of the plurality of endpoints;
  wherein the virtual talk group is associated with an event;
  assigning to the at least one endpoint of the first group of the plurality of endpoints of the virtual talk group functionality with respect to the interoperability system comprises assigning to the at least one endpoint of the first group of the plurality of endpoints of the virtual talk group functionality with respect to the interoperability system based on a type of the event;
  monitoring a change in a severity of the event;
  reassigning to the at least one endpoint of the first group of the plurality of endpoints of the virtual talk group functionality with respect to the interoperability system based on the change in severity of the event;
  adding one or more additional endpoints of the plurality of endpoints to the virtual talk group based on the change in severity of the event;
  determining a required level of user based on the event; and
  adding to the virtual talk group an endpoint of the plurality of endpoints based on the required level of user.

2. The method of claim 1, further comprising:
  adding to the virtual talk group a priority endpoint;
  removing the functionality from the at least one endpoint of the first group of the plurality of endpoints of the virtual talk group; and
  assigning to the priority endpoint the functionality.

3. The method of claim 2, further comprising, before removing the functionality from the at least one endpoint and before assigning to the priority endpoint the functionality:
  soliciting from a priority user of the priority endpoint acknowledgement of the assignment of the functionality to the priority endpoint;
  receiving the acknowledgement from the priority user via the priority endpoint;
  logging the acknowledgement; and
  notifying at least one user of the at least one endpoint of the receipt of the acknowledgement and the assignment of the functionality.

4. The method of claim 2, further comprising, before removing the functionality from the at least one endpoint of the first group of the plurality of endpoints of the virtual talk group, notifying a priority user of the priority endpoint that the functionality will be assigned to the priority endpoint.

5. A system for managing virtual talk groups, comprising a processor operable to:
  facilitate communications from a plurality of endpoints via an interoperability system, the plurality of endpoints comprising a first mobile endpoint using a first radio frequency and a second mobile endpoint using a second radio frequency different than the first radio frequency wherein each endpoint of the plurality of endpoints is associated with a communications infrastructure;

relay at least a first communication from the first mobile endpoint to the second mobile endpoint through the interoperability system;

configure a virtual talk group comprising a first group of the plurality of endpoints;

determine one or more communications infrastructure support capabilities for at least one endpoint of the first group of the plurality of endpoints;

assign to at least one endpoint of the first group of the plurality of endpoints of the virtual talk group functionality with respect to the interoperability system based on a relative priority of the at least one endpoint to other endpoints of the first group of the plurality of endpoints and relative communications infrastructure support capabilities of the at least one endpoint compared to such capabilities of the other endpoints of the first group of the plurality of endpoints;

wherein the virtual talk group is associated with an event;

a processor operable to assign to the at least one endpoint of the first group of the plurality of endpoints of the virtual talk group functionality with respect to the interoperability system comprises a processor operable to assign to the at least one endpoint of the first group of the plurality of endpoints of the virtual talk group functionality with respect to the interoperability system based on a type of the event;

monitor a change in a severity the event;

reassign to the at least one endpoint of the first group of the plurality of endpoints of the virtual talk group functionality with respect to the interoperability system based on the change in severity of the event;

add one or more additional endpoints of the plurality of endpoints to the virtual talk group based on the change in severity of the event;

determine a required level of user based on the event; and add to the virtual talk group an endpoint of the plurality of endpoints based on the required level of user.

6. The system of claim 5, wherein the processor is further operable to:

add to the virtual talk group a priority endpoint;

remove the functionality from the at least one endpoint of the first group of the plurality of endpoints of the virtual talk group; and assign to the priority endpoint the functionality.

7. The system of claim 6, wherein the processor is further operable to, before removing the functionality from the at least one endpoint and before assigning to the priority endpoint the functionality:

solicit from a priority user of the priority endpoint acknowledgement of the assignment of the functionality to the priority endpoint;

receive the acknowledgement from the priority user via the priority endpoint;

log the acknowledgement; and notify at least one user of the at least one endpoint of the receipt of the acknowledgement and the assignment of the functionality.

8. The system of claim 6, wherein the processor is further operable to, before removing the functionality from the at least one endpoint of the first group of the plurality of endpoints of the virtual talk group, notify a priority user of the priority endpoint that the functionality will be assigned to the priority endpoint.

9. A non-transitory computer readable medium, the computer readable medium comprising code that, when executed by a processor, is operable to:

facilitate communications from a plurality of endpoints via an interoperability system, the plurality of endpoints comprising a first mobile endpoint using a first radio frequency and a second mobile endpoint using a second radio frequency different than the first radio frequency, wherein each endpoint of the plurality of endpoints is associated with a communications infrastructure;

relay at least a first communication from the first mobile endpoint to the second mobile endpoint through the interoperability system;

configure a virtual talk group comprising a first group of the plurality of endpoints;

determine one or more communications infrastructure support capabilities for at least one endpoint of the first group of the plurality of endpoints;

assign to at least one endpoint of the first group of the plurality of endpoints of the virtual talk group functionality with respect to the interoperability system based on a relative priority of the at least one endpoint to other endpoints of the first group of the plurality of endpoints and relative communications infrastructure support capabilities of the at least one endpoint compared to such capabilities of the other endpoints of the first group of the plurality of endpoints;

wherein the virtual talk group is associated with an event;

code operable to assign to the at least one endpoint of the first group of the plurality of endpoints of the virtual talk group functionality with respect to the interoperability system comprises code operable to assign to the at least one endpoint of the first group of the plurality of endpoints of the virtual talk group functionality with respect to the interoperability system based on a type of the event;

monitor a change in a severity the event;

reassign to the at least one endpoint of the first group of the plurality of endpoints of the virtual talk group functionality with respect to the interoperability system based the change in severity of the event;

add one or more additional endpoints of the plurality of endpoints to the virtual talk group based on the change in severity of the event;

determine a required level of user based on the event; and add to the virtual talk group an endpoint of the plurality of endpoints based on the required level of user.

10. The medium of claim 9, wherein the code is further operable to:

add to the virtual talk group a priority endpoint;

remove the functionality from the at least one endpoint of the first group of the plurality of endpoints of the virtual talk group; and assign to the priority endpoint the functionality.

11. The medium of claim 10, wherein the code is further operable to, before removing the functionality from the at least one endpoint and before assigning to the priority endpoint the functionality:

solicit from a priority user of the priority endpoint acknowledgement of the assignment of the functionality to the priority endpoint;

receive the acknowledgement from the priority user via the priority endpoint;

log the acknowledgement; and notify at least one user of the at least one endpoint of the receipt of the acknowledgement and the assignment of the functionality.

12. The medium of claim 10, wherein the code is further operable to, before removing the functionality from the at least one endpoint of the first group of the plurality of endpoints of the virtual talk group, notify a priority user of the priority endpoint that the functionality will be assigned to the priority endpoint.

13. A system for managing virtual talk groups, comprising:
processor means for facilitating communications from a plurality of endpoints via an interoperability system, the plurality of endpoints comprising a first mobile endpoint using a first radio frequency and a second mobile endpoint using a second radio frequency different than the first radio frequency, wherein each endpoint of the plurality of endpoints is associated with a communications infrastructure;
processor means for relaying at least a first communication from the first mobile endpoint to the second mobile endpoint through the interoperability system;
processor means for configuring a virtual talk group comprising a first group of the plurality of endpoints;
processor means for determining one or more communications infrastructure support capabilities for at least one endpoint of the first group of the plurality of endpoints;
processor means for assigning to at least one endpoint of the first group of the plurality of endpoints of the virtual talk group functionality with respect to the interoperability system based on a relative priority of the at least one endpoint to other endpoints of the first group of the plurality of endpoints and relative communications infrastructure support capabilities of the at least one endpoint compared to such capabilities of the other endpoints of the first group of the plurality of endpoints; wherein the virtual talk group is associated with an event; processor means for assigning to the at least one endpoint of the first group of the plurality of endpoints of the virtual talk group functionality with respect to the interoperability system comprises processor means for assigning to the at least one endpoint of the first group of the plurality of endpoints of the virtual talk group functionality with respect to the interoperability system based on a type of the event;
processor means for monitoring a change in a severity of the event;
processor means for reassigning to the at least one endpoint of the first group of the plurality of endpoints of the virtual talk group functionality with respect to the interoperability system based on the change in severity of the event;
processor means for adding one or more additional endpoints of the plurality of endpoints to the virtual talk group based on the change in severity of the event;
processor means for determining a required level of user based on the event; and processor means for adding to the virtual talk group an endpoint of the plurality of endpoints based on the required level of user.

14. The method of claim 1, wherein facilitating communications from a plurality of endpoints via an interoperability system comprises:
receiving an internet protocol (IP) based communication from a first endpoint;
converting the IP based communication to a non-IP based communication; and
transmitting the non-IP based communication to at least a second endpoint.

15. The method of claim 1, wherein assigning to the at least one endpoint of the first group of the plurality of endpoints of the virtual talk group functionality with respect to the interoperability system further comprises assigning to the at least one endpoint of the first group of the plurality of endpoints of the virtual talk group functionality with respect to the interoperability system based on a capability of the at least one endpoint.

16. The method of claim 1, further comprising
determining a required level of decision making based on the change in severity of the event; and
based on the determined required level of decision making, automatically including into the virtual talk group a user having the required level of decision making.

* * * * *